United States Patent [19]
Perez

[11] Patent Number: 5,415,019
[45] Date of Patent: May 16, 1995

[54] STEERING COLUMN LOCKING APPARATUS

[76] Inventor: Roberto Perez, P.O. Box 190749, Boston, Mass. 02119

[21] Appl. No.: 44,200

[22] Filed: Apr. 8, 1993

[51] Int. Cl.⁶ .............................................. B60R 25/02
[52] U.S. Cl. .................................... 70/210; 70/185
[58] Field of Search ............... 70/183, 184, 185, 186, 70/210, 211, 237, 252; 188/60, 69; 180/287

[56] References Cited

U.S. PATENT DOCUMENTS

| | | | |
|---|---|---|---|
| 984,045 | 2/1911 | Stacey | 188/60 |
| 1,360,673 | 11/1920 | Olbon | 70/210 |
| 1,395,636 | 11/1921 | Giles | 70/185 |
| 1,396,508 | 11/1921 | Dunn | 70/185 |
| 1,487,863 | 3/1924 | Lavigne | 70/183 |
| 1,586,246 | 5/1926 | Kirchner et al. | 70/185 |
| 3,241,637 | 3/1966 | Temple | 188/69 |
| 4,771,618 | 9/1988 | Weber et al. | 70/185 |

FOREIGN PATENT DOCUMENTS 463048  4/1951  Italy ..................................... 70/185

Primary Examiner—Peter M. Cuomo
Assistant Examiner—Darnell M. Boucher
Attorney, Agent, or Firm—Steven G. Saunders

[57] ABSTRACT

An apparatus to restrict the movement or rotation of a steering wheel is disclosed. Such an apparatus has a gear disposed upon a portion of the steering wheel column that couples with a stopper that is disposed within a cavity defined by a sleeve. The sleeve has a plurality of sleeve walls that define the cavity, where the walls extend from a back side of the sleeve. The back side defines a hole with hole walls that extend from the back side of the sleeve toward the cavity. The stopper has grooves for coupling with the gear disposed upon an inner side of the stopper facing the gear. The grooves on the stopper interlock with grooves disposed upon the gear. The stopper further has a protrusion that extends through the hole, and a locking mechanism that extends inwardly from the protrusion to adjust the placement of the stopper within the cavity.

7 Claims, 3 Drawing Sheets

STEERING COLUMN LOCKING APPARATUS

FIELD OF THE INVENTION

This invention relates generally to a new and improved device for preventing the theft of automobiles or other motor vehicles. It more particularly concerns a device that attaches to an automobile or other motor vehicle's steering column that prevents the rotation or other movement of the steering wheel column.

BACKGROUND OF INVENTION

Automobile theft is an ever increasing problem that costs automobile owners and insurance companies billions of dollars annually. Most thieves who steal automobiles simply "hotwire" the ignition and drive away with the automobile in a matter of one or two minutes. To "hotwire" an automobile, a thief generally breaks open a section of the housing around a steering column near the ignition, cuts and connects the ignition wires, thus starting the engine. Any automobile owner who does not have some sort of anti-theft device for his automobile is therefore many times more likely to have his automobile permanently stolen, resulting in substantial monetary loss and inconvenience for both the automobile owner and insurance companies.

Many anti-theft devices have been developed to combat automobile theft. One of the most common devices is the simple car alarm. This type of device sounds a loud alarm from somewhere inside the automobile to preferably alert people who may be within earshot to call the police. It also serves to frighten the thief into fleeing from the car, thus leaving the car generally intact. This device, however, often does not deter even the novice automobile thief. By the time the police could possibly arrive on the scene, the automobile and the thief have long since departed the scene. Furthermore, because they tend to sound at unexpected and unnecessary times, automobile alarms tend to be a great inconvenience to the automobile owner. Since this is a common occurrence, especially in urban locations, the casual passerbyer generally ignores the alarm and does not notify the police, thus eliminating any advantages that such a device seeks to offer its owner.

Small transmitters that emit a signal when activated have also been placed in automobiles to counter automobile theft. Such a device is used to pinpoint the actual location of an automobile after it has been stolen. Such a device has its inherent limitations in that the device is only used after the automobile has been stolen. By the time the automobile's location has been determined and authorities arrive at the scene, the automobile could already have cut into parts. Furthermore, such transmitters have limited range. If the automobile is thus taken outside of the effective transmission radius, the device is rendered useless.

Other devices have been developed that limit an integral function of the car, thereby rendering the automobile inoperable. One such type of system blocks the fuel flow to the engine. Another type cuts off the "hot lead" of the ignition. Both methods are commonly accomplished by cutting off the power in the hot lead that drives the particular part being shut down. This is generally done by turning a switch from within the car. Any relatively sophisticated thief can find an alternative hot lead, however, and therefore bypass the need to use the original hot lead, or merely do a cursory search in common areas of the automobile where such a switch could be hidden.

External steering wheel locking devices have been used to limit use of the steering function of the automobile. Such a device suffers from similar limitations in that automobile thieves can manipulate the steering wheel and thus snap it off. Furthermore, they tend to be cumbersome and inconvenient to the user.

Accordingly, there is a great need for an alternative device that effectively and consistently prevents thieves from easily stealing automobiles and other motor vehicles.

SUMMARY OF INVENTION

It is therefore an object of this invention to effectively prevent the theft of automobiles and other motor vehicles.

It is also an object of this invention to internally lock the steering column of an automobile or motor vehicle.

It is a further object of this invention to provide an internal steering locking device that cannot be easily circumvented or nullified.

It is another object of this invention to provide an easily manufacturable device to prevent the theft of automobiles or motor vehicles.

It is additionally an object of this invention to provide an automobile or motor vehicle anti-theft device that is simple to use and is not overly cumbersome.

It is a also object of this invention to provide a permanent automobile or motor vehicle anti-theft device.

Finally, it is further object of this invention to prevent the unauthorized rotation of a steering wheel in an automobile or motor vehicle.

This invention results from the realization that a simple automobile anti-theft device can be developed that merely locks the steering column of an automobile and thus prevents operation of the automobile. After locking the steering column, and ultimately the steering wheel, the automobile cannot be driven because the operator has no control of which direction that the automobile travels.

In accordance with the invention, an apparatus to restrict the movement of a steering wheel column is disclosed. Such an invention has a gear disposed upon a portion of a steering wheel column. The gear is preferably cylindrical with teeth or grooves about an external surface of the gear. A stopper having grooves upon an inner surface facing the grooves upon the external surface of the gear is disposed within a cavity deemed by walls of a sleeve. The stopper grooves are facing the gear grooves to ultimately interlock to prevent rotation of the steering wheel column. The cavity of the sleeve is defined by cavity walls that encompass the stopper. On a back side of the sleeve, which can be attached to a steering column housing that is steel or otherwise reinforced, a hole is defined by hole walls that extend from the back side toward the cavity. The hole walls provide a surface for the stopper to contact, thus to maintain stopper within the cavity. A protrusion extends from a side opposite the grooves on the stopper. The protrusion extends through the sleeve hole and has a key insertion point upon its surface. A spring or other force applying means can be attached at one end to the protrusion and at a second end to the hole walls.

The invention further includes a locking mechanism that extends inwardly from the protrusion key insertion point to adjust the placement of the stopper within the cavity. The locking mechanism includes a key inserting point at one end of a shaft and a means for latching with the sleeve at another end of the shaft. The latching means includes a cross bar with two ends, said cross bar perpendicularly connected to the shaft and having a wing protrusion at each end to connect or couple with the sleeve.

DISCLOSURE OF PREFERRED EMBODIMENT

Other objects, features, and advantages of this invention will occur to those skilled in the art from the following description of a preferred embodiment and the accompanying drawings, in which:

Turning first to FIG. 1, there is shown an external side view of the device. From this view, the internal parts of tee lock 38 cannot be seen.

FIG. 2 is a sectional view of the tee lock 38 with a section of housing 2 peeled away. There is no hinge or the like on housing 2 since it is a stationary part.

Figure 5:
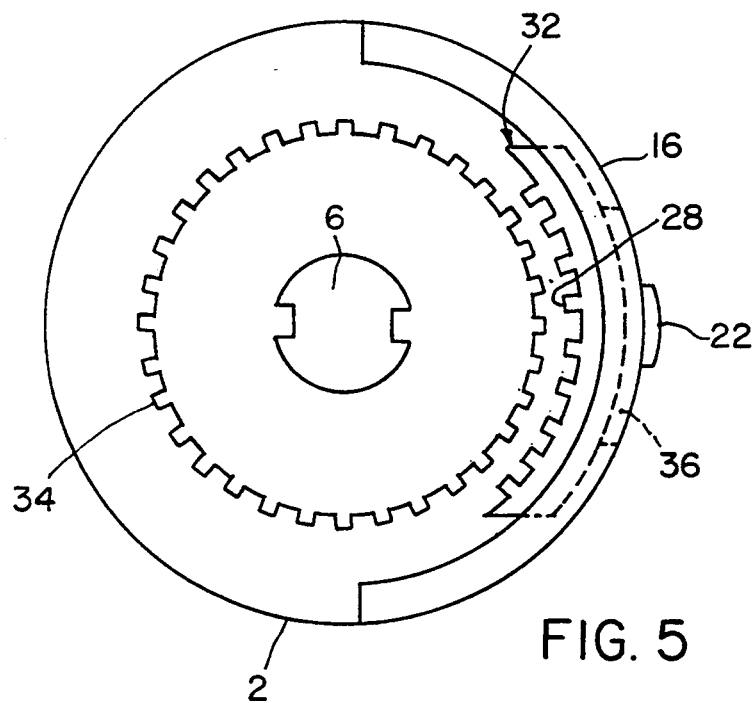

FIG. 5 is a top view of tee lock 38 demonstrating the cooperation of the individual parts of tee lock 38 within housing 2.

Figure 6:
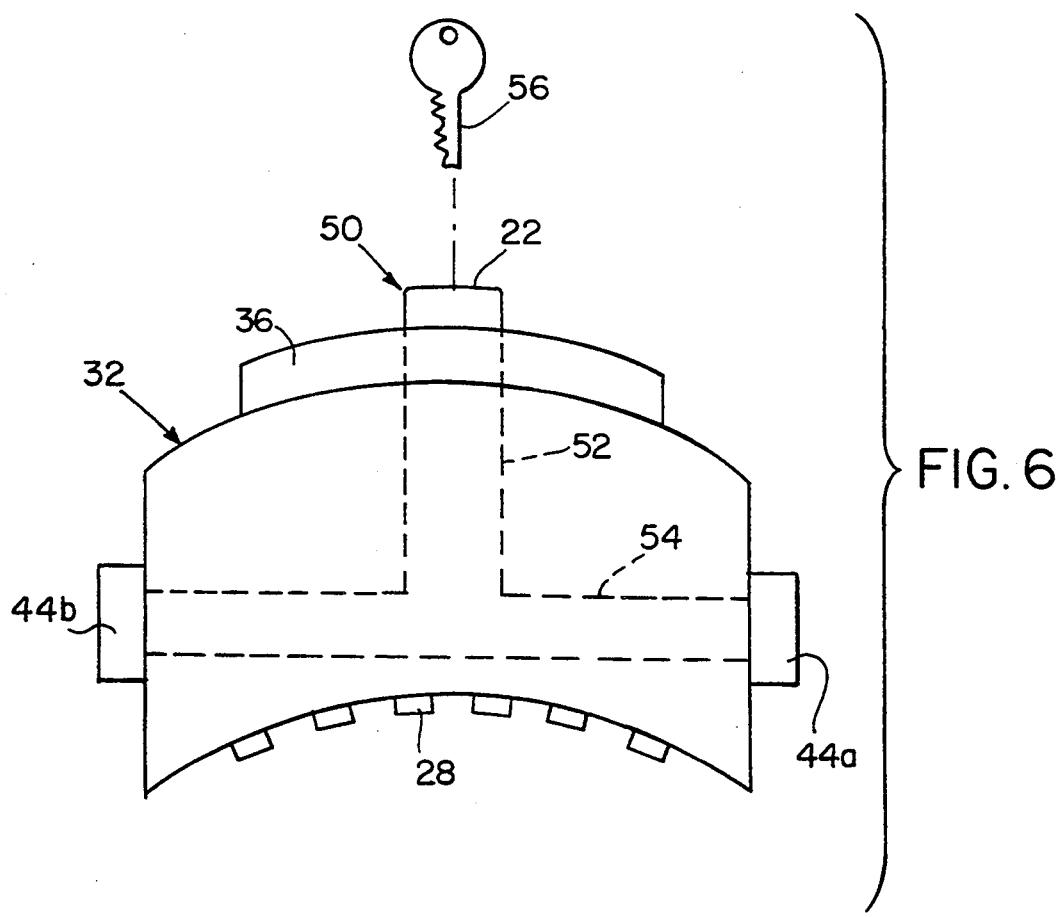

FIG. 6 is an internal view of stopper 32, demonstrating its locking mechanism 50 disposed within stopper 32.

Figure 1:
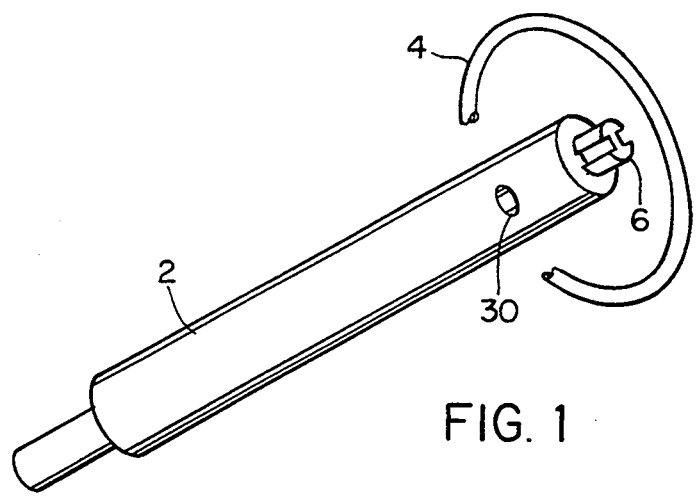
Figure 2:
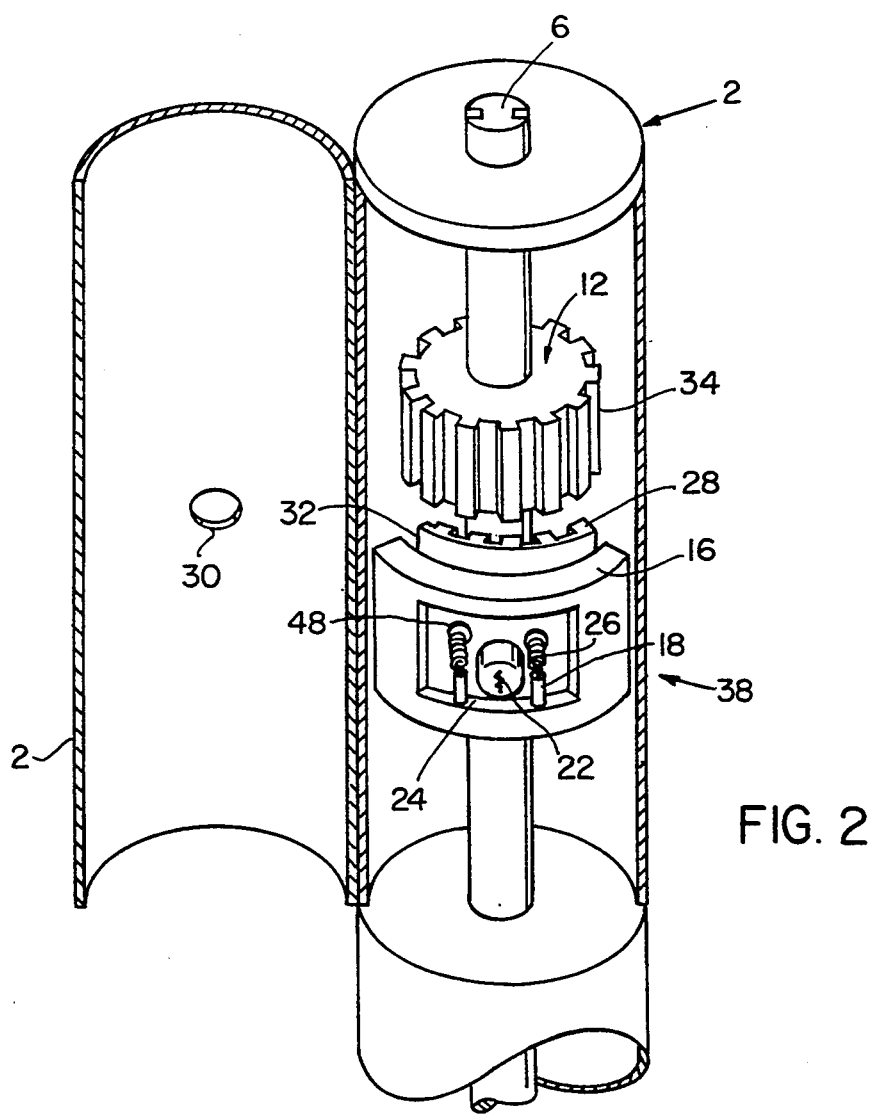
Figure 3:
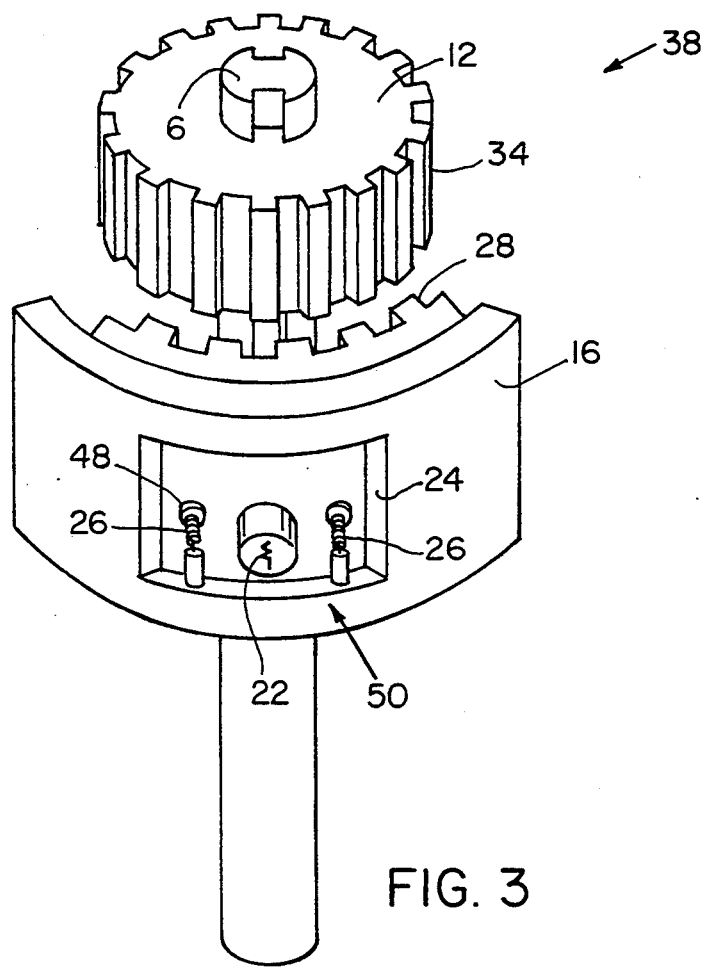
FIG. 3 is a perspective view of tee lock 38 apart from any attachment to housing 2.
Figure 4:
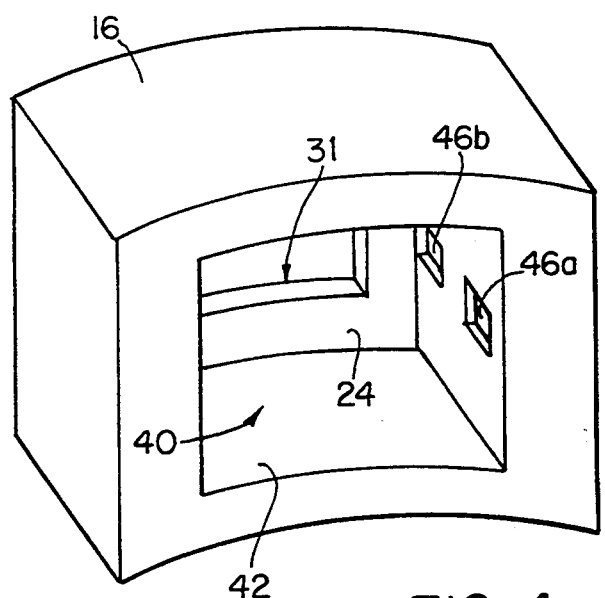
FIG. 4 is a perspective view of sleeve 16.

There is shown in FIG. 1 a steering column 6 surrounded by housing 2, attached to steering wheel 4. Hole 30 leads to tee lock 38. In the preferred embodiment shown in FIGS. 2, 3, and 4, cylindrical gear 12 is mounted upon a portion of steering column 6 such that its grooves 34 line up with and face grooves 28 on stopper 32. Stopper 32, which has protrusion 36 extending from its side opposite grooves 28, is disposed within cavity 40 that is defined by sleeve walls 42. Protrusion 36 extends out of hole 30 as wings 44a and 44b line up with wing sliders 46a and 46b to ensure that stopper 32 remains lined up properly and locked within cavity 40. A back side of sleeve 16 is attached to an inside portion of housing 2 which provides support for tee lock 38 and sleeve 16. Sleeve 16 has hole wall 24 that defines hole 31. Stopper 32, disposed within cavity 40, contacts hole wall 24 which serves to keep stopper 32 within cavity 40.

Spring 26 extends from pin 18 on hole wall 24 to stopper pin 48 disposed upon the surface of protrusion 36. Referring to FIG. 6, locking mechanism 50 extends from protrusion 36, inwardly toward the middle of stopper 32. Key hole 22 is connected to cross-bar 54 via shaft 52. Crossbar 54 is connected at its two ends to wings 44a and 44b.

Operation of a preferred embodiment of tee lock 38 is quite simple. After the automobile is parked, the key 56 is inserted into keyhole 22. Key 56 is turned clockwise to unlock stopper 32 from an inactive position out of contact with gear 12. Stopper 32 is locked into inactive position and must affirmatively be unlocked so that tee lock 38 is not accidentally activated into contact with gear 12 while the automobile is in operation. Without this feature, tee lock 38 could potentially couple with gear 12 and lock up steering column 6 while the car is in operation, resulting in a loss of control of his automobile. Force must then by applied inwardly to protrusion 36, toward steering column 6 after turning key 56 clockwise approximately 0.25 of one revolution. Stopper 32 then must travel through cavity 40 approximately 0.5-1.25 inches toward gear 12. When stopper 32 cannot be pushed any farther, key 56 is turned counterclockwise approximately 0.25 of one revolution to lock stopper 32 into activated position within cavity 40. Steering wheel 4 can be turned slightly to ensure that gear grooves 34 are properly interlocked with stopper grooves 28, thus fully preventing steering column 6 from rotating. Stopper grooves 28 are preferably very tightly interlocked with gear grooves 34 to prevent possible slippage of the device. Such grooves preferably are made of a high strength steel, metal, alloy or other material that can withstand powerful torquing forces that could be applied to steering wheel 4 or steering column 6.

In a preferred embodiment, locking mechanism 50 operates as a simple twist and lock device. When key 56 is turned clockwise approximately 0.25 of one revolution in keyhole 22, shaft 52 rotates accordingly, thus pulling crossbar 54 inwardly. Since crossbar 54 is connected to wings 44a and 44b, wings 44a and 44b also slide inwardly. When key 56 completes its 0.25 revolution turn, wings 44a and 44b are substantially within the body of stopper 32. Because of this, there is nothing preventing stopper 32 from moving forward toward gear 12 since wing sliders 46a and 46b now are not full. Stopper 32 is then pushed forward until it is in contact with gear 12. If stopper 32 is coupled with gear 12 and their respective grooves are interlocked, tee lock 38 is in activated position. To lock tee lock 38 into activated position, key 56 must then be turned 0.25 of one revolution counterclockwise. Such a turn forces crossbar 54 to push outwardly, which thus also moves wings 44a and 44b outwardly. Wings 44a and 44b then slide within wing sliders 46a and 46b, thus locking stopper 32 into activated position.

In a preferred embodiment, tee lock 38 is deactivated by reversing the steps followed in activating tee lock 38. When in activated position, key 56 must be rotated clockwise approximately 0.25 of one revolution, thus forcing crossbar 54 to move inwardly, which in turn moves wings 44a and 44b inwardly. When key 56 completes its 0.25 of one revolution turn, wings 44a and 44b are substantially within the body of stopper 32. Since wing sliders 46a and 46b are no longer full, there is nothing stopping stopper 32 from moving backward toward hole 30 that is bounded by hole walls 24. Spring 26 then forces stopper 32 back toward hole wails 24. When stopper 32 contacts hole wails 24, key 56 must be turned counterclockwise approximately 0.25 of one revolution, which again forces wings 44a and 44b into wing sliders 46a and 46b, thus locking stopper into deactivated position.

In carrying out the invention, spring 26 is attached at one end to protrusion spring attachment 48 and at another end to pin 18. When stopper 32 is in the activated position, spring 26 is fully extended, therefore continuously applying an outward pulling force from sleeve 16 to stopper 32. This allows a user to merely turn key 56 when tee lock 38 is in activated position, and the force of spring 26 automatically pulls stopper 32 backward, toward hole walls 24. Spring 26 is not a necessary feature of the invention, however, since the user can merely pull on the key and force stopper 32 backward into deactivated position.

It is to be noted that tee lock 38 is an internal device and thus can be connected to steering column 6 at any point. In one embodiment, sleeve 16 is connected to housing 2, which is reinforced to prevent breakage, at a point near steering wheel 4. In another embodiment, sleeve 16 is connected to housing 2 at an end opposite steering wheel 4. In yet another embodiment of tee lock 38, sleeve 16 can be fused to another part of the automobile, such as the floor, by a reinforced bar or other connection device.

Although specific features of this invention are shown in some drawings and not others, this is for convenience only as some feature may be combined with any or all of the other features in accordance with this invention.

Other embodiments will occur to those skilled in the art and are within the following claims:

What is claimed:

1. An apparatus to restrict the movement of a steering wheel column, comprising:
    a. a gear disposed upon a portion of the steering wheel column;
    b. a sleeve having a plurality of sleeve walls defining a cavity, said walls extending from a back side, said back side defining a hole with hole walls extending from said back side toward the cavity;
    c. a stopper disposed within said cavity, said stopper having a means for coupling with the gear disposed upon an inner side of the stopper facing the gear, a protrusion extending from an outer side of the stopper toward the hole, and a locking mechanism extending inwardly from the protrusion to adjust the placement of the stopper within said cavity; and
    d. a spring with two ends having a first end attached to said protrusion and a second end attached to said hole walls;
    said locking mechanism having a key insertion point at one end of a shaft and a retractable cross bar for latching with the sleeve at another end of said shaft, said cross bar connected to said shaft;
    said cross bar having two ends perpendicularly connected to said shaft and a wing protrusion at each end of said cross bar to couple with said sleeve.

2. The apparatus of claim 1, in which said coupling means includes a first set of grooves upon the inner side of said stopper to interlock with a second set of grooves on an external surface of said gear.

3. A steering column locking device, comprising:
    a. a first means for coupling with a second means for coupling, said first coupling means radially positioned about a section of a steering column, said second coupling means having an inner side with a second set of grooves;
    b. a means for guiding said second coupling means, said second coupling means positioned proximate said guiding means such that said second set of grooves are facing said first coupling means;
    c. a protrusion extending from an outer side of second coupling means, where said outer side is opposite said inner side; and
    d. a means for applying force to said second coupling means from said guiding means, said means for applying force connected to said second coupling means and to said means for guiding;
    said second coupling means further including a retractable cross bar extending inwardly connected to a shaft to allow said second coupling means to vary its position.

4. The steering column locking device of claim 3, in which said means for guiding includes a sleeve with a back side that defines a hole with walls, thereby containing said second coupling means within said guiding means, said protrusion aligning with said hole.

5. The steering column locking device of claim 3, in which said first coupling means includes a radial external surface with a first set of grooves to allow interlocking with said second set of grooves on said second coupling means.

6. The steering column locking device of claim 3, in which said means for applying force includes a spring.

7. The steering column locking device of claim 6, in which said spring is attached to a pin extending from said guiding means.

* * * * *